US011785276B2

(12) United States Patent
Dean

(10) Patent No.: US 11,785,276 B2
(45) Date of Patent: **\*Oct. 10, 2023**

(54) EVENT SOURCE CONTENT AND REMOTE CONTENT SYNCHRONIZATION

(71) Applicant: Tagmix Limited, London (GB)

(72) Inventor: Andy Dean, London (GB)

(73) Assignee: Tagmix Limited, London (GB)

( * ) Notice: Subject to any disclaimer, the term of this patent is extended or adjusted under 35 U.S.C. 154(b) by 144 days.

This patent is subject to a terminal disclaimer.

(21) Appl. No.: 17/443,645

(22) Filed: Jul. 27, 2021

(65) Prior Publication Data

US 2021/0360313 A1    Nov. 18, 2021

Related U.S. Application Data

(63) Continuation-in-part of application No. 16/484,379, filed as application No. PCT/GB2018/000022 on Feb. 7, 2018, now Pat. No. 11,094,349.

(30) Foreign Application Priority Data

Feb. 7, 2017    (GB) ..................................... 1702018

(51) Int. Cl.
   *H04N 21/43*     (2011.01)
   *H04N 21/845*    (2011.01)
   *G11B 27/10*     (2006.01)
   *H04N 21/439*    (2011.01)
   *G06F 16/68*     (2019.01)

(52) U.S. Cl.
   CPC ....... *H04N 21/4307* (2013.01); *G06F 16/686* (2019.01); *G11B 27/10* (2013.01); *H04N 21/4394* (2013.01); *H04N 21/8456* (2013.01)

(58) Field of Classification Search
   None
   See application file for complete search history.

(56) References Cited

U.S. PATENT DOCUMENTS 9,143,742 B1 \* 9/2015 Amira ................... H04N 7/183
11,094,349 B2 \* 8/2021 Dean .................... H04N 21/242
(Continued)

FOREIGN PATENT DOCUMENTS

WO        2015195390 A1    12/2015

*Primary Examiner* — Eileen M Adams
(74) *Attorney, Agent, or Firm* — GableGotwals

(57) ABSTRACT

A method of replacing low-quality audio content by better-quality audio content in media content comprising the low-quality audio content synchronized with video content. Tag data and/or fingerprint data associated with the low-quality audio content are used to perform a search to find a matching portion of better-quality audio content. The low-quality audio content can be replaced with the matched portion of the better-quality audio content by compiling the matched audio portion with the video content of the media content. Included is any of: compensating for an amount of timing misalignment between the low-quality audio content and the matched portion of audio content; obtaining fingerprint data for the audio content of the media content by using hash values of spectrogram frequency peaks; obtaining one or more feature vectors from the audio content of the media content to reduce a size of a search of stored instances of audio content.

20 Claims, 5 Drawing Sheets

(56) References Cited

U.S. PATENT DOCUMENTS

| | | | |
|---|---|---|---|
| 2013/0160042 A1* | 6/2013 | Stokes | H04N 21/254 725/18 |
| 2014/0192200 A1* | 7/2014 | Zagron | G06F 3/005 348/207.1 |
| 2014/0343704 A1* | 11/2014 | Liu | G06F 16/683 700/94 |
| 2015/0016661 A1 | 1/2015 | Lord | |

* cited by examiner

EVENT SOURCE CONTENT AND REMOTE CONTENT SYNCHRONIZATION

CROSS-REFERENCE TO RELATED APPLICATIONS

This application is a continuation-in-part of U.S. application Ser. No. 16/484,379 filed Aug. 7, 2019 which is the U.S. national phase 371 application of PCT Serial No. PCT/GB2018/000022 filed Feb. 7, 2018 which claims priority to British Patent Application No. 1702018.1 filed Feb. 7, 2017, each of which is incorporated herein by reference.

FIELD OF THE INVENTION

This invention relates generally to a method and system of event source content and remote content synchronization, and more particularly, but not exclusively to synchronizing higher quality recorded media content of a performance event from a source device directly recording the performance with lower quality recorded media content from a remote device recorded by an audience member at the same event.

BACKGROUND OF THE INVENTION

Audiences are recording live or capturing broadcast event performances on smartphones and other hand-held recording devices. They are also capturing or recording media content including synchronized video and audio at other events or locations where audio content is being played. These recordings provide the audience members with personalized mementos of the event performance experience. The audience member typically streams, uploads, and posts the remotely recorded video and photograph content to share their experience with others on social networks and video clip capturing and sharing applications. However, usually the remotely recorded media content of the event performance, in particular the sound quality of the audio content, is of such low quality and often so distorted and fragmented that the posted content is inaudible and unwatchable. Some event organizers may provide "official" recordings of the live performances, but these recordings do not record the fans' and spectators' personal perspective, i.e., the video and photograph captions remotely taken by the audience, of the live performance.

There is a need for a method and a system of event source content and audience remote content synchronization of event performances that address or at least alleviates some of the problems and/or limitations discussed above.

There is a need for a method of improving audio content in media content by replacing low-quality audio content of said media content by better-quality audio content.

SUMMARY OF THE INVENTION

An aspect of the invention is a method of replacing or augmenting low-quality audio content by better-quality audio content in media content where the media content comprises the low-quality audio content synchronized with video content. The method comprises using tag data and/or fingerprint data associated with the low-quality audio content to perform an audio/acoustic tag and/or fingerprint search to match the low-quality audio content with a portion of better-quality audio content. The method includes replacing the low-quality audio content with the matched portion of the better-quality audio content by compiling the matched portion of the audio content with the video content of the media content. The method may include compensating for an amount of timing misalignment between the low-quality audio content and the matched portion of the better-quality audio content when compiling it with the video content. The method may include, prior to the compiling step, determining an amount of the timing misalignment between the low-quality audio content and the matched portion of the better-quality audio content. Alternatively, or additionally, the method may include obtaining fingerprint data for the audio content of the media content by determining a plurality of hash values based on frequency peaks of the audio content of the media content and optionally determining one or more metrics from said plurality of hash values. Alternatively, or additionally, the method may include, prior to performing the audio/acoustic tag and/or fingerprint search, obtaining one or more feature vectors from the audio content of the media content and using said one or more feature vectors to reduce a size of a search using said tag data and/or fingerprint data of stored instances of audio content recorded or provided by the one or more second devices.

Another aspect of the invention is a method of replacing or augmenting first device recorded audio content by second device recorded audio content in media content recorded by the first device, the media content comprising the audio content recorded by the first device synchronized with video content recorded by said first device, the method comprising the steps of: receiving the first device recorded media content; based on tag data and/or fingerprint data associated with the audio content of the media content, performing an audio/acoustic tag and/or fingerprint search to match the audio content of said media content with a portion of audio content recorded or provided by the second device; and replacing or augmenting the audio content of the media content with the matched portion of the audio content recorded or provided by the second device by compiling the matched portion of the audio content with the video content of the media content; wherein the method includes compensating for an amount of timing misalignment between the audio content of the media content and the matched portion of the audio content recorded or provided by the second when compiling the matched portion of the audio content with the video content of the media content.

In an embodiment, the method may include, prior to compiling the matched portion of the audio content with the video content of the media content, determining an amount of timing misalignment between the audio content of the media content and the matched portion of the audio content.

In an embodiment, the step of determining an amount of timing misalignment may comprise comparing one or more segments of the audio content of the media content with one or more segments of the matched portion of the audio content recorded or provided by the second device.

In an embodiment, wherein the one or more segments of the audio content of the media content and the one or more segments of the matched portion of the audio content recorded or provided by the second device may be provided by processing each of said audio content of the media content and the matched portion of the audio content using a Hanning window to provide for each one or more window segments of a predetermined, selected, or calculated size.

In an embodiment, the predetermined, selected, or calculated size of the one or more window segments may be set at twice a value of an expected or anticipated timing misalignment between the audio content of the media content and the matched portion of the audio content.

In an embodiment, the one or more segments of the audio content of the media content may be cross-correlated with the one or more segments of the matched portion of the audio content recorded or provided by the second device to obtain a cross-correlation array from which the amount of the timing misalignment is determined.

In an embodiment, the one or more segments of the audio content of the media content may be cross-correlated with the one or more segments of the matched portion of the audio content recorded or provided by the second device using Generalized Cross Correlation with Phase Transform (GCC-PHAT).

In an embodiment, a plurality of the segments of the audio content of the media content may be cross-correlated with a plurality of the segments of the matched portion of the audio content recorded or provided by the second device to provide an array of misalignment timings.

In an embodiment, a median value of the array of misalignment timings may be taken to be the amount of timing misalignment used to compensate the timing of the matched portion of the audio content recorded or provided by the second device when compiling it with the video content of the media content.

In an embodiment, misalignment timings in the array of timing misalignments which fall outside a predetermined, selected or calculated range of a most common value of the misalignment timings may be discounted when determining a median value of the array of misalignment timings to be taken as the amount of timing misalignment used to compensate the timing of the matched portion of the audio content recorded or provided by the second device when compiling it with the video content of the media content.

Another aspect of the invention is a device for replacing or augmenting first device recorded audio content by second device recorded audio content in media content recorded by the first device, the media content comprising the audio content recorded by the first device synchronized with video content, the device comprising: an identity content module which receives the first device recorded media content and, based on tag data and/or fingerprint data associated with the audio content of the media content, performing an audio/acoustic tag and/or fingerprint search to match the audio content of said media content with a portion of audio content recorded or provided by the second device; tag content module for replacing or augmenting the audio content of the media content with the matched portion of the audio content recorded or provided by the second device; and a compose content module for the matched portion of the audio content with the video content of the media content; wherein the device is configured to compensate for an amount of timing misalignment between the audio content of the media content and the matched portion of the audio content recorded or provided by the second when compiling the matched portion of the audio content with the video content of the media content.

Another aspect of the invention is a method of replacing or augmenting first device recorded audio content by second device recorded audio content in media content recorded by the first device, the media content comprising the audio content recorded by the first device synchronized with video content, the method comprising the steps of: receiving the first device recorded media content; based on tag data and/or fingerprint data associated with the audio content of the media content, performing an audio/acoustic tag and/or fingerprint search to match the audio content of said media content with a portion of audio content recorded or provided by the second device; and replacing or augmenting the audio content of the media content with the matched portion of the audio content recorded or provided by the second device by compiling the matched portion of the audio content with the video content of the media content; wherein the step of obtaining tag data and/or fingerprint data for the audio content of the media content comprises: determining a plurality of hash values based on frequency peaks of the audio content of the media content.

In an embodiment, the method may include determining one or more metrics from said plurality of hash values.

In an embodiment, the step of performing an audio/acoustic tag and/or fingerprint search may comprise using one or more of said plurality of hash values or one or more metrics determined from said plurality of hash values to search for one or more matching hash values or one or more matching metrics of said stored instances of second device recorded or provided audio content.

In an embodiment, any matching metrics of the stored instances of second device recorded or provided audio content may be ranked to determine which stored instance of second device recorded or provided audio content comprises the matched portion of the audio content recorded or provided by the second device or comprises a best matched portion of the audio content recorded or provided by the second device.

In an embodiment, prior to storing instances of audio content recorded by the one or more second devices, each instance of audio content recorded by the one or more second devices is processed in the same manner as the audio content of the media content by: determining a plurality of hash values based on frequency peaks for each instance of audio content recorded by the one or more second devices; and optionally determining one or more metrics from said plurality of hash values.

In an embodiment, the audio content of the media content may be down-sampled prior to obtaining fingerprint data for said audio content of the media content.

In an embodiment, the plurality of hash values may be determined by selecting a frequency peak of said audio content of the media content and determining hash values of other frequency peaks with respect to the selected frequency peak.

Another aspect of the invention is a device for replacing or augmenting first device recorded audio content by second device recorded audio content in media content recorded by the first device, the media content comprising the audio content recorded by the first device synchronized with video content, the device comprising: an identity content module which receives the first device recorded media content and, based on tag data and/or fingerprint data associated with the audio content of the media content, performing an audio/acoustic tag and/or fingerprint search to match the audio content of said media content with a portion of audio content recorded or provided by the second device; tag content module for replacing or augmenting the audio content of the media content with the matched portion of the audio content recorded or provided by the second device; and a compose content module for the matched portion of the audio content with the video content of the media content; wherein the device is configured to obtain tag data and/or fingerprint data for the audio content of the media content by determining a plurality of hash values based on frequency peaks of the audio content of the media content.

Another aspect of the invention is a method of replacing or augmenting first device recorded audio content by second device recorded audio content in media content recorded by the first device, the media content comprising the audio content recorded by the first device synchronized with video content, the method comprising the steps of: receiving the first device recorded media content; based on tag data and/or fingerprint data associated with the audio content of the media content, performing an audio/acoustic tag and/or fingerprint search to match the audio content of said media content with a portion of audio content recorded or provided by the second device; and replacing or augmenting the audio content of the media content with the matched portion of the audio content recorded or provided by the second device by compiling the matched portion of the audio content with the video content of the media content; wherein, prior to performing the audio/acoustic tag and/or fingerprint search, obtaining one or more feature vectors from the audio content of the media content, and using said one or more feature vectors to reduce a size of a search of stored instances of audio content recorded or provided by the one or more second devices.

In an embodiment, the step of obtaining one or more feature vectors from the audio content of the media content may comprise obtaining one or more feature vectors from one or more selected portions of the audio content of the media content.

In an embodiment, one or more feature vectors may be invariant in time and/or may have a predetermined length.

Another aspect of the invention is a device for replacing first device recorded audio content by second device recorded audio content in media content recorded by the first device, the media content comprising the audio content recorded by the first device synchronized with video content, the method comprising the steps of: an identity content module which receives the first device recorded media content and, based on tag data and/or fingerprint data associated with the audio content of the media content, performs an audio/acoustic tag and/or fingerprint search to match the audio content of said media content with an associated portion of audio content recorded or provided by the second device; tag content module for replacing the audio content of the media content with the associated matched portion of the audio content recorded or provided by the second device; and a compose content module for compiling the associated matched portion of the audio content recorded or provided by the second device with the video content of the media content; wherein the device is configured to, prior to performing the audio/acoustic fingerprint search, obtaining one or more feature vectors from the audio content of the media content and using said one or more feature vectors to reduce a size of stored instances of audio content recorded or provided by the one or more second devices to be searched.

Another aspect of the invention is a method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of: receiving the media content recorded by the spectator device; based on fingerprint data associated with the audio content of the media content recorded by the spectator device, performing an audio/acoustic fingerprint search in a content database or store to match the audio content in said media content recorded by the spectator device with an associated portion of better-quality source device recorded audio content; replacing the audio content of the media content recorded by the spectator device with the associated matched portion of better-quality source device recorded audio content; and compiling the associated matched portion of better-quality source device recorded audio content with the video content of the media content recorded by the spectator device.

In an embodiment, method may comprise making available said compiled associated matched portion of better-quality source device recorded audio content with the video content of the media content recorded by the spectator device to the spectator or to a user of a system for compiling said associated matched portion of better-quality source device recorded audio content with the video content of the media content recorded by the spectator device.

In an embodiment, the spectator device may record images, and the method comprises the server or the spectator device compiling the images with the associated matched portion of better-quality source device recorded audio content and the video content of the media content recorded by the spectator device.

In an embodiment, the method may comprise the server, based on said fingerprint data associated with the audio content of the media content recorded by the spectator device, performing an audio/acoustic fingerprint search in a content database or store to match the audio content in said media content recorded by the spectator device with the associated portion of better-quality source device recorded audio content.

In an embodiment, the method may comprise the spectator device recording time and location data of the audio content recorded by the spectator device.

In an embodiment, the method may comprise the server or the spectator device manually associating tags with the audio content recorded by the spectator device to allow synchronization at the server of the associated matched portion of better-quality source device recorded audio content and the video content of the media content recorded by the spectator device.

In an embodiment, the method may comprise multiple users each having a separate spectator device for recording respective synchronized audio content and video content of a part of the event, wherein the method includes repeating the steps of claim 1 for at least one other spectator's respective recorded synchronized audio content and video content of a part of the event.

In an embodiment, the source device recorded audio content may be a studio quality recording of the event performance and the spectator device recorded audio content comprises ambient noise of the event performance recording and lower quality recording of the event performance.

Another aspect of the invention is a server device for replacing low quality spectator device recorded audio content by better-quality source device recorded audio content in media content recorded by the spectator device at an event, said content recorded by the spectator device comprising synchronized audio content and video content of a part of the event, the server device comprising: an identity content module which receives the media content recorded by the spectator device and is configured to, based on fingerprint data associated with the audio content of the media content recorded by the spectator device, perform an audio/acoustic fingerprint search in a content database or store to match the audio content in said media content recorded by the spectator device with an associated portion of better-quality source device recorded audio content; a tag content module configured to replace the audio content of the media content recorded by the spectator device with the associated matched portion of better-quality source device recorded audio content; and a compose content module configured to compile the associated matched portion of better-quality source device recorded audio content with the video content of the media content recorded by the spectator device.

In an embodiment, the compose content module may be configured to make available said compiled associated matched portion of better-quality source device recorded audio content with the video content of the media content recorded by the spectator device to the spectator or to a user of a system for compiling said associated matched portion of better-quality source device recorded audio content with the video content of the media content recorded by the spectator device.

In an embodiment, the compose content module may be configured to compile images recorded by the spectator device with the associated matched portion of better-quality source device recorded audio content and the video content of the media content recorded by the spectator device.

Another aspect of the invention is a non-transitory computer readable medium storing machine-readable instructions executable by a processor of an electronic device for implementing the method of: replacing low quality spectator device recorded audio content by better-quality source device recorded audio content in media content recorded by the spectator device at an event, said media content recorded by the spectator device comprising synchronized audio content and video content of a part of the event, the method comprising the steps of: receiving the media content performing an audio/acoustic fingerprint search in a content database or store to match the audio content in said media content recorded by the spectator device with an associated portion of better-quality source device recorded audio content; replacing the audio content of the media content recorded by the spectator device with the associated matched portion of better-quality source device recorded audio content; and compiling the associated matched portion of better-quality source device recorded audio content with the video content of the media content recorded by the spectator device.

In an embodiment, the content database or store may be an audio/acoustic fingerprint database.

In an embodiment, the compiled associated matched portion of better-quality source device recorded audio content with the video content of the media content recorded by the spectator device may be compiled with any one or more of photographs, content from content providers or brand material from sponsors.

In an embodiment, wherein the photographs, content from content providers or brand material from sponsors may be used to fill gaps in the video content of the media content recorded by the spectator device.

In an embodiment, wherein the photographs, content from content providers or brand material from sponsors may be used to fill any gaps in the video content occurring during a length of the matched portion of better-quality source device recorded audio content.

In an embodiment, the compiled associated matched portion of better-quality source device recorded audio content with the video content of the media content recorded by the spectator device may be overlaid with other spectator recorded audio content.

Another aspect of the invention is a method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of: receiving the media content recorded by the spectator device; based on fingerprint data associated with the audio content of the media content recorded by the spectator device, matching the audio content in said media content recorded by the spectator device with an associated portion of better-quality source device recorded audio content; replacing the audio content of the media content recorded by the spectator device with the associated matched portion of better-quality source device recorded audio content; and compiling the associated matched portion of better-quality source device recorded audio content with the video content of the media content recorded by the spectator device; wherein the method comprises the server or the spectator device manually associating tags with the audio content recorded by the spectator device to allow synchronization at the server of the associated matched portion of better-quality source device recorded audio content and the video content of the media content recorded by the spectator device.

Another aspect of the invention is a method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of: receiving the media content recorded by the spectator device; based on fingerprint data associated with the audio content of the media content recorded by the spectator device, matching the audio content in said media content recorded by the spectator device with an associated portion of better-quality source device recorded audio content; replacing the audio content of the media content recorded by the spectator device with the associated matched portion of better-quality source device recorded audio content; and compiling the associated matched portion of better-quality source device recorded audio content with the video content of the media content recorded by the spectator device; wherein the method comprises multiple users each having a separate spectator device for recording respective synchronized audio content and video content of a part of the event, wherein the method includes repeating the steps of claim 1 for at least one other spectator's respective recorded synchronized audio content and video content of a part of the event.

Another aspect of the invention is a method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of: receiving the media content recorded by the spectator device; based on fingerprint data associated with the audio content of the media content recorded by the spectator device, matching the audio content in said media content recorded by the spectator device with an associated portion of better-quality source device recorded audio content; replacing the audio content of the media content recorded by the spectator device with the associated matched portion of better-quality source device recorded audio content; and compiling the associated matched portion of better-quality source device recorded audio content with the video content of the media content recorded by the spectator device; wherein the compiled associated matched portion of better-quality source device recorded audio content with the video content of the media content recorded by the spectator device may be compiled with any one or more of photographs, content from content providers or brand material from sponsors; and wherein the photographs, content from content providers or brand material from sponsors is used to fill gaps in the video content of the media content recorded by the spectator device.

Another aspect of the invention is a method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of: receiving the media content recorded by the spectator device; based on fingerprint data associated with the audio content of the media content recorded by the spectator device, matching the audio content in said media content recorded by the spectator device with an associated portion of better-quality source device recorded audio content; replacing the audio content of the media content recorded by the spectator device with the associated matched portion of better-quality source device recorded audio content; and compiling the associated matched portion of better-quality source device recorded audio content with the video content of the media content recorded by the spectator device; wherein the compiled associated matched portion of better-quality source device recorded audio content with the video content of the media content recorded by the spectator device is overlaid with other spectator recorded audio content.

An aspect of the invention is a method of synchronizing event media content comprising remote content having at least a first type and a second type of media recorded by a user on a user device, and source content comprising the first type of media, the method comprising: identifying with identifying means in the data structure of the first type of media remote content recorded by the user; matching the identifying means with associated source content portion; replacing the remote content with the associated source content portion; and compiling the associated source content portion of the first type of media with the remote content of the second type of media recorded by the user.

In an embodiment, the first type of media of the source content is audio, the first type of media recorded by the user is audio and the second type of media recorded by the user is video. A third type of media may be recorded by the user is photograph and compiling the associated source content portion of the first type of media with the second and third type of media recorded by the user.

In an embodiment, the first type of media of the source content is audio, the first type of media recorded by the user is audio and the second type of media recorded by the user is photograph. The source content may comprise only the first type of media content audio.

In an embodiment, the identifying means may be identified in the data structure of the time and location of the first type of media remote content recorded by the user. The identifying means may be identified in the data structure with tags manually generated by the user of the first type of media remote content recorded by the user.

In an embodiment, multiple users may each have a separate user device for recording first type and second type of media recorded by the associated user attending the same event, compiling the associated source content portion of the first type of media with the remote content of the second type of media content recorded by different users at different times during the duration of the source content.

In an embodiment, the source content is a studio quality recording of the event performance. The remote content may comprise ambient noise of the event performance recording and lower quality recording of the event performance.

An aspect of the invention is a system of synchronizing event media content comprising remote content having at least a first type and a second type of media recorded by a user, and source content comprising the first type of media, the method comprising: a recognition module with identifying means for identifying the first type of media remote content recorded by the user, and matching the identifying means with associated source content portion; a synchronization module for replacing the remote content with the associated source content portion; and a compiler for compiling the associated source content portion of the first type of media with the remote content of the second type of media recorded by the user.

In an embodiment, the recognition module comprises an identifying module with identifying means in the data structure of the time and location of the first type of media remote content recorded by the user; and a matching module for matching the identifying means with associated source content portion.

In an embodiment, the first type of media of the source content is audio, the first type of media recorded by the user is audio and the second type of media recorded by the user is video. A third type of media may be recorded by the user is photograph and compiling the associated source content portion of the first type of media with the second and third type of media recorded by the user.

In an embodiment, the first type of media of the source content is audio, the first type of media recorded by the user is audio and the second type of media recorded by the user is photograph. The source content may comprise only the first type of media content audio.

In an embodiment, the identifying means may be identified in the data structure of the time and location of the first type of media remote content recorded by the user. The identifying means may be identified in the data structure with tags manually generated by the user of the first type of media remote content recorded by the user.

In an embodiment, multiple users may each have a separate user device for recording first type and second type of media recorded by the associated user attending the same event, compiling the associated source content portion of the first type of media with the remote content of the second type of media content recorded by different users at different times during the duration of the source content.

In an embodiment, the source content is a studio quality recording of the event performance. The remote content may comprise ambient noise of the event performance recording and lower quality recording of the event performance.

An aspect of the invention is a computer implemented method of synchronizing event media content comprising remote content having at least a first type and a second type of media recorded by a user, and source content comprising the first type of media, the method comprising: identifying with identifying means in the data structure of the time and location of the first type of media remote content recorded by the user; matching the identifying means with associated source content portion; replacing the remote content with the associated source content portion; and compiling the associated source content portion of the first type of media with the remote content of the second type of media recorded by the user.

An aspect of the invention is a user electronic device for a method of synchronizing event media content comprising remote content having at least a first type and a second type of media recorded by a user, and source content comprising the first type of media: a memory storing machine readable instructions; and a processor configured to execute the machine-readable instructions to implement the steps of the method in accordance with an embodiment of the invention.

An aspect of the invention is a system of synchronizing event media content comprising remote content having at least a first type and a second type of media recorded by a user, and source content comprising the first type of media: a server having a memory for storing machine readable instructions and a processor configured to execute the machine readable instructions; a first user electronic device having a memory for storing machine readable instructions and a processor configured to execute the machine readable instructions; the server and the first user electronic device being configured to communicate with each other over a network; wherein the server and the first user electronic device interoperate to implement the steps of the method in accordance with an embodiment of the invention.

An aspect of the invention is a computer readable medium storing machine readable instructions executable by a processor of a user electronic device for implementing the steps of the method in accordance with an embodiment of the invention.

A computer readable medium storing machine readable instructions executable by a processor of a server for implementing the steps of the method in accordance with an embodiment of the invention.

BRIEF DESCRIPTION OF THE DRAWINGS

The accompanying drawings incorporated herein and forming a part of the specification illustrate several aspects of the present invention and, together with the description, serve to explain the principles of the invention. While the invention will be described in connection with certain embodiments, there is no intent to limit the invention to those embodiments described. On the contrary, the intent is to cover all alternatives, modifications and equivalents as included within the scope of the invention as defined by the appended claims. In the drawings:

DETAILED DESCRIPTION

An embodiment of the invention is a method and apparatus for synchronizing event media content comprising remote audio and video content recorded by a spectator or fan user from the speakers at an event performance, and source audio content recorded directly from the performance as recorded by a promotor, club, music provider, band, or the like. The source audio content has a better acoustic quality than the remote audio content recorded by the spectator. Typically, the remotely recorded media content recorded of the event performance by the user on the user device, such as a smartphone, or the like, in particular the sound quality of the audio content, is of such low quality and often so distorted and fragmented that the recorded remote content is inaudible and unwatchable. The user device acoustic recording means for recording the remote content is typically far inferior to the sound recording equipment quality used for recording the source content. The better-quality audio source content replaces the lower quality audio remote content recorded by the user spectator and is synchronized and layered with the video remote content recorded by the user. The resulting event source audio/remote video media content provides a user's personalized account or memento of the event with clean studio-clear sound quality audio.

Figure 1:
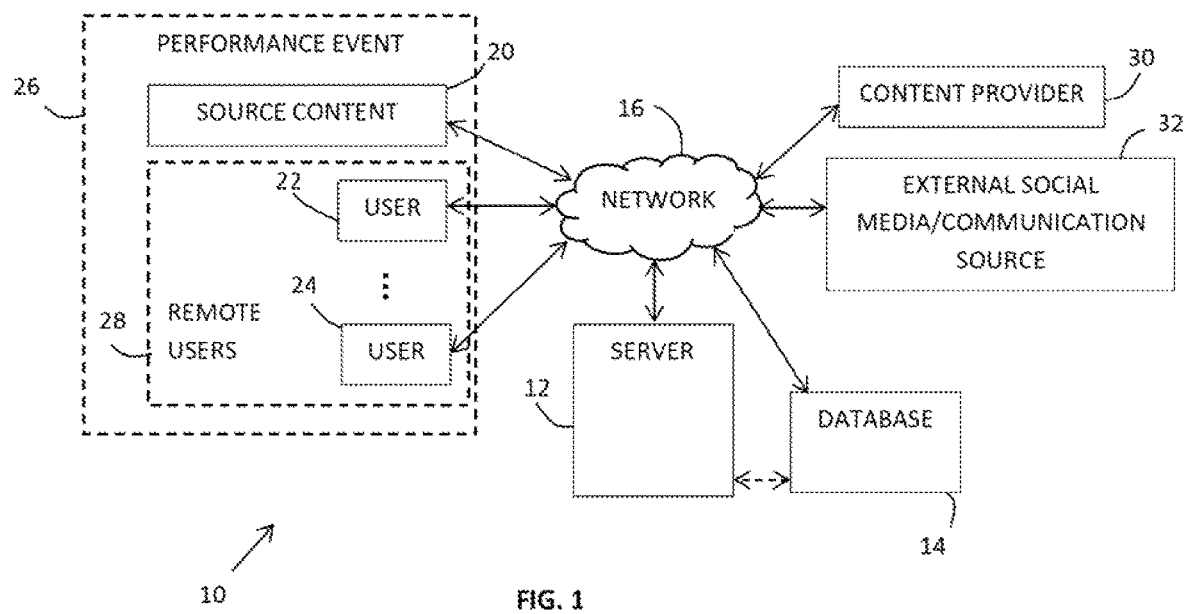
FIG. 1 shows a schematic block diagram of a system in accordance with an embodiment of the invention.

Referring to FIG. 1, a schematic block diagram 10 is shown of a system in accordance with an embodiment of the invention. The event source content and remote content synchronization system 10 shows a server 12 with a database 14 in communication via a network 16, such as the internet, local area network, or the like, with source content 20 and at least one user 22,24 or a plurality of users 28. The users 22 record the event performance 26. The event performance may be a live event, or a broadcast live event. The event performance may be a broadcast of a previously recorded event. In an embodiment, the source content 20 may be streamed live or recorded live at the event. The source content may be recorded music tracks recorded at a studio and played or broadcast at the event, on the radio, or the like. The user may capture the broadcast of the music track in the background while recording video on the user device. Content providers 30 may provide the source content that is a higher sound quality than the remote content recorded by the user. Content providers may provide additional material that may be relevant to the performance, such as other media content, such as text, audio content, images, photographs, video, video clips and the like. External social media/communication source 32 is shown in communication via the network to upload and share content.

Figure 2:
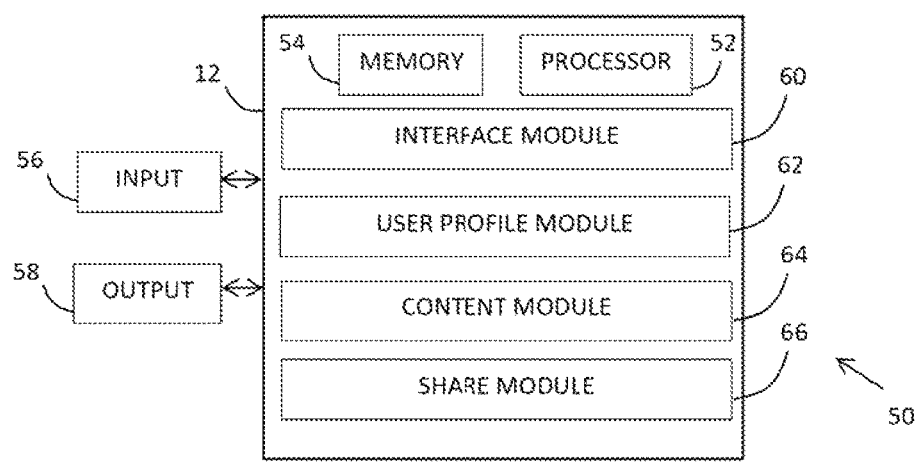
FIG. 2 shows a schematic block diagram of a server as shown in FIG. 1 in more detail in accordance with an embodiment of the invention.

FIG. 2 shows a schematic block diagram 50 of a server 12 as shown in FIG. 1 in more detail in accordance with an embodiment of the invention. The server 12 comprises a processor 52 and a memory 54 for storing and executing the applications and processing the different modules of the applications of the system. The server may comprise an input means 56 and output means 58, and an interface module 60 for communicating with different modules and devices of the system. The modules of the server may comprise a user profile module 62 for maintaining user profile accounts of the users, a content module 64 for managing the content of performances, a share module 66 to share the source content of the module with users, a recognition module 68 comprising an identify content module 70 to identify the remote content and a match content module 72 to match the remote content with source content, and a mix module 74 to replace, overlay, or the like, the unclear audio remote content with the clearer audio source content with the other media video remote content.

Figure 3:
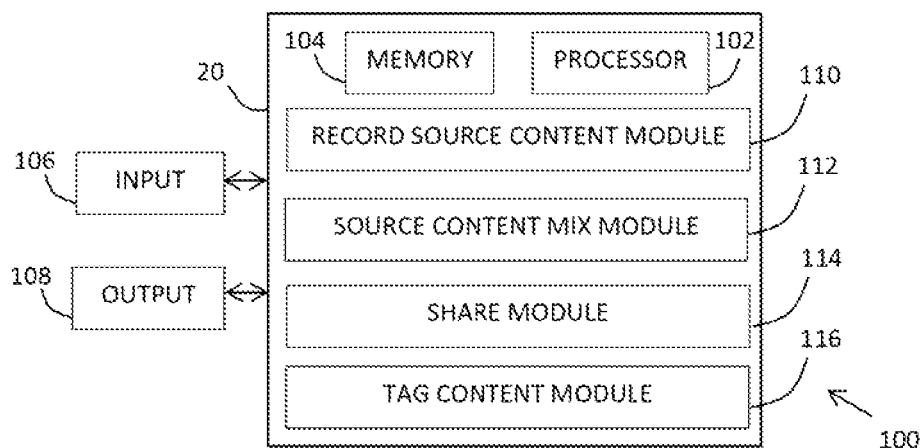
FIG. 3 shows a schematic block diagram of a source recording device as shown in FIG. 1 in more detail in accordance with an embodiment of the invention.

FIG. 3 shows a schematic block diagram 100 of a recording device of the source content 20 as shown in FIG. 1 in more detail in accordance with an embodiment of the invention. The recording device of the source content 20 comprises a processor 102 and a memory 104 for storing and executing the source content of the performance and processing the different modules of the source content recording device 20. The recording device of the source content may comprise an input means 106 and output means 108, and a record source content module 110 for recording the source content, source content mix module 112 for mixing source content if required, a share module 114 for sharing the source content with users, and a tag content module 116 to tag the content to allow synchronization of the content. It will be appreciated that the storage of the source content may be stored in storage residing on the source content recording device itself, somewhere remote to the source content recording device, such as the server 12, database 14, content provider storage 30, external social media/communication source 32, cloud storage (not shown), other remote storage, or the like. The recording device of the source content records the performance content directly from the event performance, or in other words, in a more direct manner than compared with the remote user device. For example, the source content recording device may comprise direct link hook up to the output of the performers' digital output of electronic music sequencers, synthesizers, audio output of instruments, or the like, or sensitive high specification analog/digital microphones positioned in close proximity to the performers and/or instruments, or the like, to provide a substantially higher sensitivity and higher quality recording than ever achievable with a remote user's recording device. The source content of the event performance may be recorded live and broadcast in real time, live streamed event, or broadcast at a later time after the live event. The source content may be recorded on stage, in a recording studio, or the like. The source content may be broadcast by some broadcast means, such as a concert venue, radio station, night club, cinema, concert house, theatre, concert, or the like. The source content of the performance event may be broadcast anywhere on a speaker system, and the user with the user device records or captures the remote content from the output of the speakers. The source content recording may be adjusted by filters, sound engineering equipment, and the like to improve the quality of the source content recording. In contrast, the user remote recording device is typically remote from the performers between the speakers of the performance event picking up interfering surrounding sounds, distortion, feedback, and the like. Accordingly, the source content recorded achieves a much higher quality level than the lower quality achievable with the user device.

Figure 4:
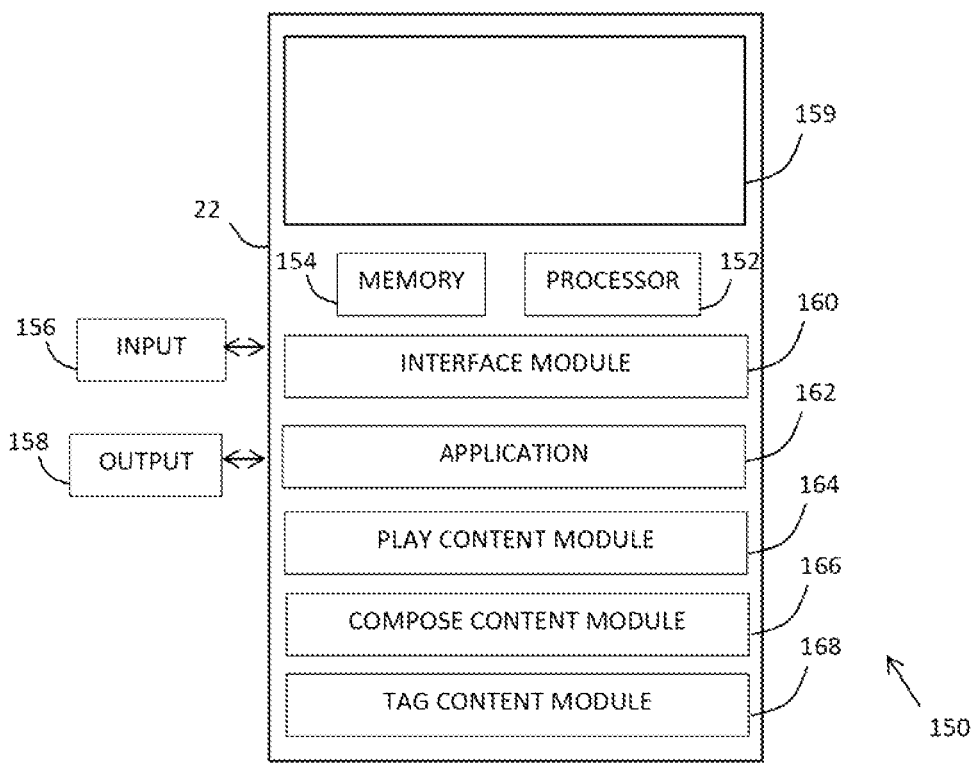
FIG. 4 shows a schematic block diagram of a user device recording device as shown in FIG. 1 in more detail in accordance with an embodiment of the invention.

FIG. 4 shows a schematic block diagram 150 of a user device recording device 22 as shown in FIG. 1 in more detail in accordance with an embodiment of the invention. The user device 22 comprises a processor 152 and memory 154 for storing and executing the applications and processing the different modules of the user device and applications of the system, and a user interface module for communicating with different modules and devices of the system and the user. The user device 22 may comprise input 156 and output 158 means for the user to enter and retrieve commands and information of the system and for communicating with different modules and devices of the system. The input means 156 may comprise a microphone, a video camera, and the like. The output means may comprise of display 159, a speaker, and the like, and the user device modules may comprise an application 162 module for running the method and system in accordance with an embodiment of the invention, a play content module 164 for playing the media content on the user device, a compose content module 166 for the user to compose and share media content originating from the user device, manage content and tag module 168 for storing and maintaining the media content resident on the user device in content store or storage area 169, or the like. It will be appreciated that the storage of the remote content and/or source content may be stored in storage residing on the user device itself in content store 169, somewhere remote to the user device, such as the server 12, database 14, content provider storage 30, external social media/communication source 32, cloud storage (not shown), other remote storage, or the like. The interaction of the different modules 60,62,64,66 of the server 12, modules 110,112,114,116 of the source content recording device 20, and of modules 160,162,164,166,168 of the user device 22 is described in more detail with reference to FIG. 5-8.

Figure 5:
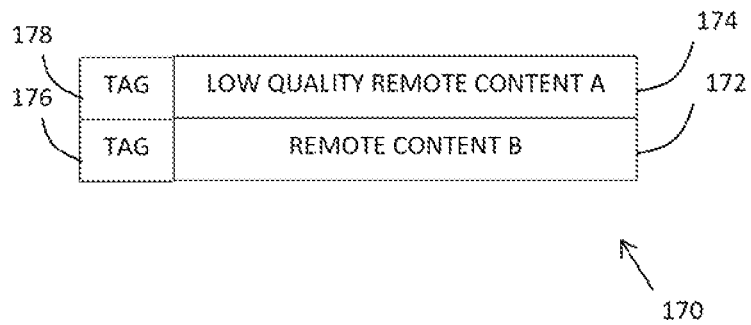
FIG. 5-7 show schematic diagrams of data structures of remote media content compiled with source media content.
Figure 6:
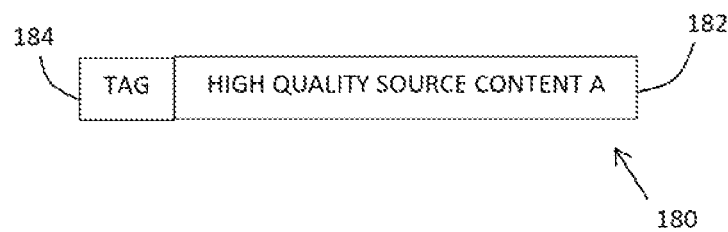
Figure 7:
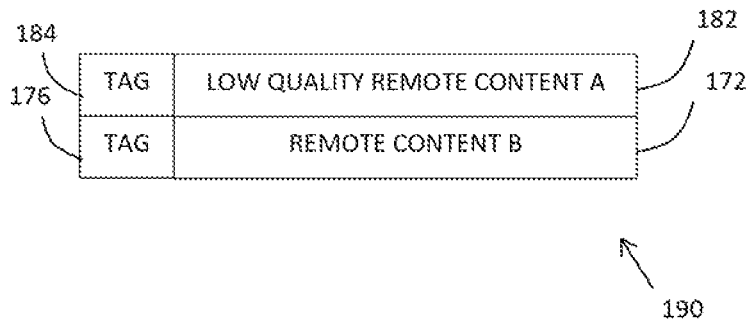

FIG. 5-7 show schematic diagrams of data structures 170,180,190 of remote content and source content. More specifically, FIG. 5 shows a schematic diagram 170 of a data structure of remote media content recorded by user at an event performance. The data structure of the remote media content 170 comprises a layered or dual media content, i.e., remote content B 172 layer, and remote content A 174 layer. Remote content B 172 may be the video portion of the remote media content, while the remote content A 174 may be the audio portion of the remote media content. Each portion comprises a tag 176,178, metadata, or the like, comprising identifying means, identifying data, or the like, to allow synchronization of the remote and source data. For example, the embedded identifying data tag or metadata container may comprise ID3 metadata, geodata or geographical location data with latitude and longitude coordinates, time stamp data, artist name, song or track name, genre, album title, album track number, release date, and the like to identify the multimedia audio and/or video content Referring to FIG. 6, the data structure 180 shows the high quality source content A 182 and associated tag 184 of the source media content recorded and captured by the performer source recording device.

Referring to FIG. 7, the resulting matched data structure 190 is shown of the remote media content B 172 layer with associated tag 176 of FIG. 5 compiled, embedded, and layered with the high-quality source content A 182 layer with associated tag 184 of FIG. 6. The low-quality remote content A 174 of FIG. 5 is stripped from the data structure 170 of the remote media content recorded by the user and replaced by the higher-quality source content A with associated tag 184 of FIG. 6. This results in a data structure 190 having a dual data structure with some remote content captured by the user, and some source content captured by the performer source recording device. In this embodiment, the remote content B 172 may be video content, and the remote content A 174 and source content A 182 may be audio. It will be appreciated that the content may be other forms of media content, such as photographs, video, audio, and the like.

The tags 176,178,184 provide identifying means to enable the synchronization of the content. For example, the tags in this embodiment identify the time and geo location which identifies the event performance, and the part of the performance recorded. This information is critical to accurately, identify, match, and synchronize the high-quality source content with the remote content. For example, in some performance venues, such as multi-stage music festivals or electric music club venues, there may be several acts occurring at the same time at different stages or rooms.

Therefore, in such a scenario, the geo location accuracy is sufficient to differentiate between venue stages or rooms. It will be appreciated that other forms of identifying means may be used instead of or in addition to time stamp and/or geo location.

Upon the application 162 of the user device 22 communicating the identifying details of the tag 178 of the lower quality remote content A 174 to the server, the higher quality source content A 182 is identified and transmitted to the user device. The higher quality source content A 182 is synchronized with the remote content B 172.

In an embodiment, when the clean audio from a club/promoter, music or track producer, audio track played on the radio, or the like, i.e., source content, is received, there may be a certain amount of associated metadata or tags, both automatically and manually generated. The associated metadata or tags may include additional information such as start and end times, geolocation, name of venue, promoter, event, location, DJ(s), performer(s), theme, music genres, occasion, or the like. As the source content is typically recorded by a music or track producer, event organizer, or the like, the quality of the source content is of high studio-like quality. The remote content recorded by the user is typically recorded from a distance away or remote from the speakers broadcasting the recorded or live streamed content. Accordingly, all outside and inside background ambient noise at the live event performance is also recorded by the user in the remote content.

When a user uploads the remote content, i.e., the video, the audio, and/or fingerprinted data associated with the audio, to the server, then there may also be a certain amount of associated metadata in the remote content recorded by the user generated and embedded by the application running on the recording device of the user device. Some of associated metadata or tags associated with the user remote content may be auto generated, for example, start time, end time, clip length to derive end time, geolocation, time zone, or the like. Additionally, some associated metadata or tags associated with the user remote content may include tags that are manually generated by the user, for example event name, music genres, or the like. The associated metadata may be calculated or derived from the existing auto generated associated metadata, for example, if the geolocation is known from the existing geolocation, the event and venue may be derived if known or matched against known data. In an embodiment, the users' manually generated metadata, such as for example, what the DJ, genre, or the like, is playing to enrich our clean audio data.

In an embodiment, audio or acoustic fingerprint search of the remote content may be used to search a fingerprint database for matching source content. Content databases or storage areas may be searched such as event content database 14, a content provider 30 database, content store 169 storing existing content on the user device 150 the user may already have stored, or the like, to find the correct piece of source content audio to match the remote content audio. It will be appreciated that source content may be searched on any number of storage areas such as content stored in storage residing on the user device itself in content store 169, somewhere remote to the user device, such as the server 12, database 14, content provider storage 30, external social media/communication source 32, cloud storage (not shown), other remote storage, or the like. The stored content in any number of databases and storage areas may be searched to determine if there is a match of a live or known event in event content database 14, or a known track from content providers 30. For example, the remote content recorded by the user may capture music played on the radio, jukebox, or the like, in the background, for example in a car whilst driving, or at a restaurant, or the like. The track is identified and matched. The associated metadata from the user may be used to filter the list of potential audio clips so that it is possible to find the correct clip much quicker, rather than searching through all the existing clips, which may not be relevant.

Figure 8:
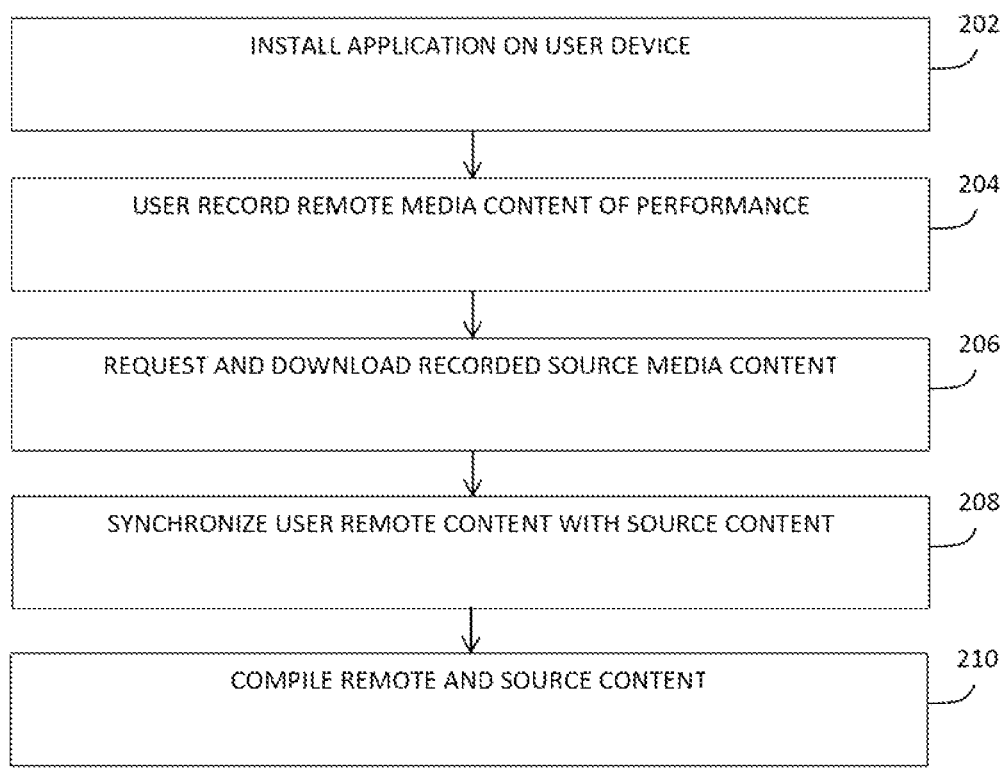
FIG. 8 is a flow chart of a method in accordance with an embodiment of the invention.

FIG. 8 is a flow chart of a method 200 in accordance with an embodiment of the invention. The method of the user device installs 202 the application on the user device, and the user records remote media content of a performance 204. The user requests and downloads recorded source media content 206, and the application synchronizes the user remote content with the source content 208. The remote content and the source content are compiled 210.

In an embodiment, the remote media content is identified and matched in a recognition module 68 with stored music tracks. The remote media content or unclean audio content may be identified and matched with source content or clean audio with a finger-print type match, or the like. Acoustic fingerprinting processes are used in the industry and may be applied herein with embodiments of the invention. The stored music tracks may be stored in an events database 14 such as live event performances, provided by content providers 30 such recorded audio tracks, or the like. The remote content is identified and matched with the event performances in the events database and tracks in the content provider databases. For example, the media content may be categorized as a live event with a live event flag and may match an event performance source content stored in the events database 14. If no matches are found in the events database, and a match may be made in the content provider or music application program interface (API) provider.

In an embodiment, once the clean source audio is compiled and embedded with the user's video, the user may post the user's personal remote content B 172 onto an external social media, video clip capturing and sharing system, and the like, capturing the user's personal moment of the performance taken from the perspective of the user, with the higher quality source content A 182. Another user in the plurality of users 28 shown in FIG. 1, may take several actions within the network and server, such as view the post, comment on the post, follow the user that posted the post, be alerted for similar events in the future, and the like.

In an embodiment, the source audio of an event replaces with the remote audio of the user's event content remote video with the source audio. The source audio is transmitted to the user device, and the application, located on the user device, synchronizes the event content remote video with the source audio. It will be appreciated that the synchronization may occur at other devices within the systems, such as at the server, the user device, and the like. In an embodiment resulting data structure may comprise an mp4 format file, or the like, with just user video on the user device with source audio. It will be appreciated that any playback file or format may be used to be played back on an any number of multi-media play back application to replay the synchronized source audio content with the fans' remote video/photograph content.

In an embodiment, a user's other multi-media event-related content residing on the user device (or other storage associated with the user device) other than the just the video, such as photographs, etc., together with the video and may be synchronized with the source audio. It will be appreciated that even some of the lower quality audio taken by the fans' may be over laid on top of the source audio. This will provide an enhanced personal experience of the audio playback of the source audio with the audio portions of the fan.

For example, the fan may want portions of the fan's singing or chanting to be audible with the playback of the source audio. In an embodiment the resulting data structure may comprise an mp4 format file, or the like, with user video and other user multi-media content on the user device with source audio. It will be appreciated that any playback file or format may be used to be played back on any number of multi-media play back applications to replay the synchronized source audio content with the fans' remote video/photograph content.

In an embodiment, a user's video may be compiled with source audio and source multi-media content, such as photographs taken during the performance event. Typically, the photographs may be taken on the same user device that has recorded with video and audio portions of the event, and the photographs may be taken between the videos. The photographs, or other multi-media content, may also have data structures with tags as shown in FIG. 5-7 with geo-location, time stamps, or the like, such that the photographs would be shown for a period of time (for example approximately 1-5 seconds, or the like) during the replay of source audio content and synchronized fans' remote video/photograph and other multi-media content at the specific time the photograph was taken during the performance. In an embodiment the resulting data structure may comprise an mp4 format file, or the like, with user video (and other user multi-media content) on the user device with source audio and source multi-media content provided by the source server. It will be appreciated that any playback file or format may be used to be played back on an any number of multi-media play back applications to replay the synchronized source audio content with the fans' remote video/photograph content. In an embodiment, multi-user's video in a group of users may be compiled together into a single video with source audio. This may result with an advanced audio coding (AAC), mp4 video format file, or the like, with video and other content, such as video, photos, and the like, from multiple user devices with source audio. The selection of users' video/photograph clips may be chosen at random, or from users within a group of users that have some links between them, i.e., the fans have indicated that they are agreeable to share content with each other within an organized group within the system network of users. It will be appreciated that any playback file or format may be used to be played back on any number of multi-media playback applications to replay the synchronized source audio content with the fans' remote video/photograph content. It will be appreciated that the remote content may be recorded by a user, and the user may be a member of the audience, a performer, a presenter holding the performance, or the like.

In an embodiment, other content from content providers such as promoters, brand material from sponsors, and the like may be compiled together into a single video with the user's content and the source content audio. This might be useful if it may be necessary or convenient to fill any gaps between fans' time stamped video/photograph sequences in the video portion synchronized with the source audio portion if there are some gaps in the fans' video/photograph during the entire length of the source audio track of the entire event performance.

The foregoing description is of methods, devices, and systems where one or more users use user electronic devices to record media including synchronized video and audio at an event and thereafter wish to replace the poor-quality audio in their recorded media with better-quality source device recorded audio, said better-quality source device recorded audio being recorded, for example, using professional equipment at said event. However, the aspects of the invention are not limited to users being in an event with professional audio recording equipment but could comprise a user being in any location where external audio is captured in their media recording at said location and where a better-quality audio recording of the captured audio is available from any suitable source or any other device. This could include, merely by way of example and without any limitation, attending a wedding where the external audio comprise the vows spoken by the bride and groom recorded by the wedding venue, or attending a wedding where a disc jockey plays music at the wedding reception, or attending a sports venue where crowd noise is recorded by one or more other devices, or in a restaurant where external audio is recorded by one or more other devices, or at any of the above where the better-quality audio can be retrieved from an already produced recording made long before the user records their media content. Consequently, the essence of the invention is enabling a user to replace poor-quality audio in their media recording with better quality audio where said media recording is made anywhere, any place and/or at any time and preferably where nothing needs to be added to the audio in the user's recorded media or in the better-quality audio at the time of recording or after for enabling the matching and replacement steps of the invention.

By 'replacement', the aspects of the invention may include overlaying the better-quality audio with some or all of the user's poor-quality audio to provide a combination of, for example, professional quality audio but retaining some of the unique aspects of the user's poor-quality audio such as, for example, spoken comments captured in the media recording.

Figure 9:
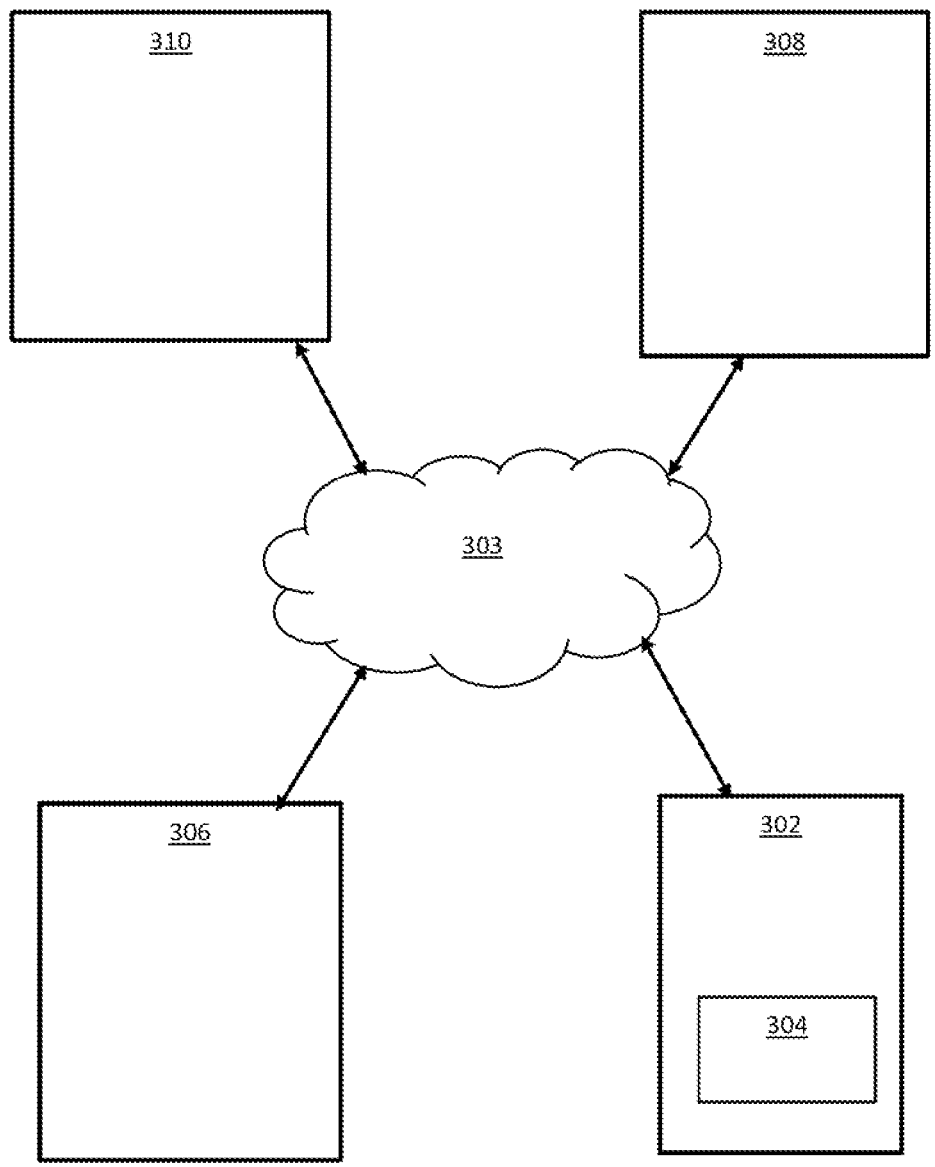
FIG. 9 shows a schematic block diagram of a system in accordance with an embodiment of the invention.

FIG. 9 is a schematic block diagram of a system 300 in accordance with an embodiment of the invention for implementing the afore-described methods according to the invention and the improved methods hereinafter described.

The system 300 comprises a first device 302 configured to perform among other things recording of media content comprising synchronized video and audio content. The first device 302 preferably comprises a handheld device such as a smart phone but could comprise any suitable user device for recording media content as shown in FIG. 4. The first device 302 could, in some embodiments, comprise a digital camera preferably configured to host and execute an application 304 comprising machine code which implements the methods of the invention. It is, however, only necessary that the first device 302 is able to record media content and for such content to be retrievable from or accessible in the first device 302 by any suitable means including over a communications network 303.

The system 300 includes a second device 306. In one embodiment, the second device 306 is a device or system configured to record or make available audio content. Preferably, the device or system is configured to record high-quality audio content. This may comprise master audio recordings or high-fidelity audio recordings. However, in some embodiments, the second device 306 may be representative of devices or systems which comprise a source of already recorded audio content and, as such, for these embodiments, the second device 306 need not be capable of itself being configured to record audio content but being capable of making such audio content available over the communications network 303 or the like. The second device 306 may comprise for some embodiments a database storing audio content. The second device 306 may comprise a streaming client system or the like providing access to stored audio content. Preferably, the second device 306 is configured to record and/or provide high or better-quality audio content. In this context, high or better-quality audio content is considered audio content of higher fidelity than that recorded by the first device 302.

The system 300 may include multiple second devices 306 (not shown) and may also include multiple first devices 302 (not shown).

The system 300 preferably includes a database 308 for storing tag data and/or fingerprint data of audio content received from the one or more second devices 306.

Where one or more of said second devices 306 makes available one or a plurality of instances of audio content such, as for example, a library of audio content or selected instances of audio content from said library, then, in one aspect of the method of the invention, one or more of said instances of audio content from the one or more second devices 306 may be processed by a server 310 which is configured to extract or generate tag data and/or fingerprint data for said provided instances of audio content. The server 310 transmits said tag data and/or fingerprint data to the database 308. The database 308 may be a separate device to the server 310 or may be integrated therewith.

Similarly, if the one or more second devices 306 comprise other user devices or other devices or systems capable of recording or providing audio content then such content may be made available to the server 310 over the network 303 and be processed by the server 310 to extract or generate tag data and/or fingerprint data for said provided audio content and to transmit said tag data and/or fingerprint data to the database 308.

Where a user of a first device 302 records media content but wishes to improve or replace the audio content of the media content, the user can operate the first device 302 to make the media content available to the server 310. The server 310 is configured to extract the audio content from the received media content and to process said audio content in a same manner as for already processed instances of audio content provided by the one or more second devices to thereby extract or generate tag data and/or fingerprint data for said extracted audio content. The server 310 then uses the extracted or generated tag data and/or fingerprint data for said extracted audio content to search the database 308 to try to match the extracted audio content with audio content or a portion of audio content recorded or provided by the second device 306.

Once a matched portion of audio content recorded or provided by the second device 306 is found, the server 310 retrieves said matched portion of audio content and uses it to replace or augment the audio content of the media content by compiling the matched portion of the audio content with the video content of the media content. The matched portion of the audio content compiled with the video content of the media content can then be made available to the user and/or other users to download, stream or share.

An improvement to the methods of the invention resides in compensating for a possible timing misalignment between the extracted audio content and the matched portion of the audio content recorded or provided by the second device 306 when or prior to compiling the matched portion of the audio content with the video content of the media content. The improved method compensates for an amount of timing misalignment between the audio content of the media content and the matched portion of the audio content recorded or provided by the second device 306, i.e., the server 310 will preferably shift the matched portion of the audio backwards or forwards as appropriate by a determined amount of timing misalignment of the matched portion of the audio with respect to the audio content of the media content.

The compensation of timing misalignment between the matched portion of the audio with respect to the audio content of the media content is more effective when the two audio signals are assumed to be identical or nearly identical and when there is assumed to be a small amount of lead or lag timing misalignment between said two audio signals of, for example, +/−one second. Consequently, improving the matching process of the audio content of the media content, as discussed hereinafter, to find a best matched portion of the audio recorded or provided by the one or more second devices 306 leads to improved timing misalignment compensation.

In a preferred method of determining an amount of timing misalignment between the matched portion of the audio with respect to the audio content of the media content, the server 310 is configured to compare one or more and preferably a plurality of N segments of the signal comprising the audio content of the media content with one or more and preferably a plurality of at least N segments of the signal comprising the matched portion of the audio content recorded or provided by the second device 306. The segments are preferably overlapping and preferably of a same predetermined, selected, or calculated size. Each of the audio signal segments for the matched portion of the audio content and each of the segments of the audio content of the media content are windowed using a Hanning window algorithm. The Hanning window size of each windowed segment is preferably set to be a size greater than an expected or anticipated timing misalignment between the audio content of the media content and the matched portion of the audio content. The Hanning window size of each windowed segment is preferably set to be a size greater than an expected or anticipated timing misalignment by a factor of at least two. For example, where the expected or anticipated timing misalignment is one second, the Hanning window size is preferably set at least at twice this value of say two seconds. The windowed segments preferably overlap. The degree of overlap is selected such that the sum of all windowed sections maintains a signal processing overlap between windowed segments and such that the overall signal level is maintained and/or is recoverable.

Some or all of the corresponding windowed segments of each of the matched portion of the audio content and the audio content of the media content are then cross-correlated to obtain a cross-correlation array from which the amount of the timing misalignment can be determined. The corresponding windowed segments of each of the matched portion of the audio content and the audio content of the media content are preferably cross-correlated using a Generalized Cross Correlation with Phase Transform (GCC-PHAT) algorithm. The GCC-PHAT cross-correlation is therefore performed for some or all of the N corresponding windowed segments to obtain the cross-correlation array of N timing misalignment entries.

The arg max (arguments of the maxima) may be taken to comprise the amount of timing misalignment between the matched portion of the audio and the audio content of the media content and thus the amount of timing misalignment used for compensating the timing of the matched portion of the audio when compiled with the video content of the media content.

In one embodiment, a median value of the array of misalignment timings may be taken to comprise the amount of timing misalignment used to compensate the timing of the matched portion of the audio content recorded or provided by the second device when compiling it with the video content of the media content.

In a preferred embodiment, any misalignment timings in the array of timing misalignments which fall outside a predetermined, selected, or calculated range of a most common value of the misalignment timings are discounted when determining a median value of the array of misalignment timings to be taken as the amount of timing misalignment used to compensate the timing of the matched portion of the audio content. In one embodiment, the predetermined, selected, or calculated range comprises +/−10% of the modal value, i.e., of the most common value of the misalignment timings. Cleaning the array of timing misalignments of any misalignment timings which fall outside the predetermined, selected, or calculated range has the advantage of removing rogue misalignment timings caused by, for example, a high noise floor and/or other artifacts in the audio signals. The matched portion of the audio content is shifted backwards or forwards along the time-line as appropriate based on the determined amount of misalignment timing when the matched portion of the audio content is compiled with the video content of the user's media content.

It has been found that compensation of timing misalignment may be performed subject to a known or selected tolerance time value. The value of the tolerance time is an amount of time by which the matched portion of the audio content can remain misaligned after timing compensation. The tolerance time value may be chosen as one which does not result in noticeable simultaneity errors by a user between the matched portion of the audio content and the video content of the media content once compiled together and being viewed/listened to. The tolerance time value preferably falls within a range of the compiled matched portion of the audio content leading the video content by not more than 45 milliseconds and preferably not more than 35 milliseconds and lagging the video content by not more than 125 milliseconds and preferably not more than 100 milliseconds. The tolerance time value range has the advantage of reducing the accuracy of determining the amount of timing misalignment. It also improves matching of audio content recorded or provided by the one or more second devices 306 to audio content of the media content recorded by a first device 302.

It will be noted that the compensation of timing misalignment does not require any processing of the video content of the media content and does not require any data or timing indications to be added to the matched portion of the audio content or the audio content or the video content of the media content at the time of recording or even post-recording, e.g., no such data or timing indications or other timing or synchronization data need be provided when the audio signals are processed to extract or generate tag data and/or fingerprint data. The audio and video signals can be recorded in conventional devices and no additional processing other than as described herein is required to implement the methods of the invention.

Obtaining fingerprint data for audio content may comprise storing data comprising a representation of an audio content file in a database or other storage device such that a search of the database based on a query results in a matched portion of audio content for the query if matching fingerprint data exists in the database. This holds true where the query comprises fingerprint data extracted or generated for audio content associated with the database query using a same method for the extraction or generation of fingerprint data for the audio content associated with the stored data comprising the representation of the audio content file in the database. In the present invention, this equates to storing in the database 308 fingerprint data for stored instances of audio content from one or more of the second devices 306 and subsequently extracting or generating fingerprint data for audio content of user media content from the first device 302 to form a database query. It will be understood that the instances of audio content recorded or provided by the one or more second devices 306 may not themselves be stored in the fingerprint data database 308 but may be stored in other devices or systems pointed to by the fingerprint data stored in the database 308 and accessible over the network 303.

A suitable program that can be adapted for extracting or generating fingerprint data for audio content is the open-source program "DejaVu"™. This is a program written in Scala for monitoring event streams against temporal logic formulas. The formulas are written in a first-order past time linear temporal logic, with the addition of macros and recursive rules. The logic also supports reasoning about time. DejaVu™ exhibits 100% recall when reading an unknown wave file from disk or listening to a recording for at least 5 seconds.

It will be understood that the method of extracting or generating fingerprint data for pieces of audio content in accordance with the invention is not limited to using "DejaVu"™ and that other suitable programs can be employed.

Audio content and music in particular is digitally encoded as a long list of numbers. In an uncompressed .wav file, there are 44100 numbers per second (44.1 kHz) per channel meaning that a 3-minute-long song has almost 16 million samples.

For the purposes of the methods of the present invention, relevant frequency information for fingerprinting is found in the range of about 20 Hz to 2500 Hz, i.e., about the range of human hearing. Therefore, to improve speed of processing and reduce the amount of irrelevant information/data, the audio content being processed for fingerprinting data is down-sampled from 44.1 kHz to about 5 kHz. An advantage of down-sampling the audio content is that less frequency resolution is required for obtaining the same amount of information and it also decreases granularity which allows more room for error in matching two pieces of audio content within the aforementioned preferred time tolerance range. This is particularly true where one of the pieces of audio content taken from media content from a first device 302 such as a user's handheld mobile device is "dirty" audio, i.e., subject to external ambient noise and/or recorded by low-fidelity equipment.

Down-sampling in the manner proposed by the present invention reduces the Fast Fourier Transform (FFT) size from 4096 FFTs at 44.1 kHz with a granularity of 10.7 Hz to 128 at 5 kHz with a granularity of 39 Hz; granularity in this context meaning the distance from one FFT bin to a next FFT bin.

The FFT is used over small windows of time to create a spectrogram which comprises a 2-dimensional array with amplitude as a function of time and frequency. The spectrogram shows the amplitudes of the audio content signal at respective frequencies. The frequency and time values are discretized representing a "bin" while the amplitudes are real-valued.

In this context, "peaks" comprise a time/frequency pair corresponding to an amplitude value which is the maximum in a local 'neighborhood'. By plotting (discretizing) the maximum peaks, this results in discrete integer values for time/frequency pairs which can be respectively binned into bins of time/frequency pairs. This reduces the infinite information of the peaks into finite values and thus a finite amount of fingerprinting data. It follows that a matching piece of acoustic content will highly likely result in an identical or near identical binning of amplitude peak values with respect to time/frequency pairs even where one of the pieces of audio content for which a match is sought is 'dirty'.

Preferably, for each FFT in the spectrogram, a straight line is fitted to the result and then removed from the FFT to provide a more normalized frequency response across low and high ends. The lines removed from the FFT spectrogram can be binned and normalized within the bins which has the advantage of flattening the frequency response and placing equal emphasis across the frequency spectrum.

Instead of selecting a set or fixed minimum amplitude value, a minimum amplitude value may be automatically calculated as a median spectrogram level plus one median absolute deviation which results in signal level time invariant signatures or fingerprints.

A hash function will take an integer input and return another integer as an output. It will also return the same integer output for a same integer input. The methods of the invention generate hash values for frequency peaks in the FFT spectrogram. By combining peak frequencies along with their time differences and creating hash values this results in a unique fingerprint for a piece of audio content. The formula at a general level is:

Hash(frequencies of peaks,time difference between peaks)=fingerprint hash value.

There are a number of ways that the hash values based on frequency peaks and their time differences can be extracted or generated and all such ways can be implemented in the methods of the invention. However, a preferred way is to select a frequency peak in the spectrogram as an anchor frequency peak and identify the time difference between the anchor frequency peak and a next selected frequency peak. The fingerprint hash value for this pair of peaks can then be generated. The process is repeated between the anchor peak and a next selected peak until hash values have been generated for 1-2, where "1" is the anchor peak and "2" is the first next selected peak after the anchor peak, 1-3, where "3" is the next selected peak after "2", 1-4, 1-5, etc., until sufficient hash values have been generated to comprise a unique fingerprint for a piece of audio content. As few as 5 hash values can be used as a unique fingerprint for a piece of audio content, but it is preferred to generate hash values from the spectrogram of a piece of audio content until a default fan value for fingerprinting is met. The default fan value may be selected such that selected peaks are within 500 (MAX_HASH_TIME_DELTA) spectrogram samples of each other which may result in up to 60 hash values for a piece of audio content. The hash values for a piece of audio content can be stored and/or processed as a 2-dimensional array of values. The default fan value may be adjustable but is preferably set to a value of 60.

It will be understood that the foregoing method of extracting or generating fingerprint data for pieces of audio content can be used to obtain unique fingerprint data or signatures for audio content recorded or provided by the one of more second devices 306 and subsequently for the audio content of the media content from the first device 302. The unique fingerprint data for the instances of audio content recorded or provided by the one of more second devices 306 are preferably stored in the fingerprint database 308 and the unique fingerprint data for the audio content of the media content from the first device 302 is used to create a database query in order to find a matched portion of preferably better-quality stored audio content for replacing or augmenting the audio content of the media content from the first device 302.

Preferably, the method of searching a database query includes extracting metrics between the database query and a stored database instance, i.e., an instance of a unique fingerprint stored in the database 308. Preferably, intersecting hashes between the fingerprint of the database query audio content and the instance of the unique fingerprint stored in the database 308 are obtained by finding the intersection of the 2-dimension hash value arrays of said fingerprint of the database query and said instance of the unique fingerprint stored in the database 308 to return the sorted unique hash values that are found in both of said 2-dimensional hash value arrays. This may be calculated using the "np.intersectId" algorithm. Using the index values of the query match and the database match can enable a quality of the match to be determined.

One or more possible metrics to be used in identifying a matched portion of audio content for the audio content of the database query, i.e., the extracted audio content of the media content from the first device 302, may include:

1. an offset metric comprising time differences between each corresponding hash intersection;

2. a match ratio comprising a number of matches divided by the number of hashes in the query—this could be expressed as a percentage (%);

3. a true offset metric based on a mode value of the offset array of item 1 above, the most common offset value being the one that occurs most frequently;

4. a Kurtosis metric comprising a Kurtosis for the offset array of item 1 above—the Kurtosis value for the offset array gives important information on the randomness of the distribution; note that a completely random distribution will have a negative Kurtosis value;

5. a single bin domination metric comprising offset values that are contained within one histogram bin divided by the total number of offset values—this gives a metric for how many of the matching hashes are in the correct order.

Any appropriate combination of the above metrics may be utilized.

It has been recognized that the order of the matching hashes is more significant than the amount of hashes that match and consequently the order of matching hashes may be given greater weight in determining a best matched portion of audio content than the amount or number of matching hashes.

When a database query is being processed, the search of the database 308 will involve iterating through each database instance and calculating one or more of the above metrics for each saved instance in the database 308. An output from the database 308 of the search results may take the form of [metrics, name] where name identifies the database instance and thereby identifies an associated stored audio content recorded by or provided by the one or more second devices 306.

Preferably, the metrics calculated for each instance in the database 308 based on the search query are ranked. This may be achieved by sorting the results by Mahalanobis distance, resulting in an order of furthest from the multidimensional mean value in terms of standard deviations. Since there should be only one 'best match' and many wrong or poor-quality matches, this results in a rank of the database matches from best match to worst match.

Preferably also, for audio content recorded or provided by the one or more second devices 306 and the audio content of media content from the one or more first devices 302, each of their fingerprints are arranged in a form comprising an array of hashes and corresponding array of indexes with audio content [name] which enables easy storage in the database 308, enables all inputs to be consolidated in a library file or folder, etc., and enables easier processing of database queries.

The methods of the invention may also be enhanced by reducing the hash size of the database query obtained from the audio content of the media content of the first device 302. The methods of the invention may additionally or alternatively be enhanced by reducing the hash size of the fingerprint database instances of audio content recorded or provided by the one or more second devices 306.

Searching for a matching portion of audio content recorded or provided by the one or more second devices 306 to replace or augment the audio content of the media content recorded by one of the one or more first devices 302 can be likened to searching a database query comprising a number N of query hashes in the database 308 storing a multitude of instances of a number K of database query hashes. In other words, this amounts to searching a database query derived from audio content of the media content recorded by one of the one or more first devices 302 where said audio content fingerprint has a number N of hash values and using said database query to search some or all instances of stored fingerprints for audio content recorded or provided by the one or more second devices 306 where each instance of the stored fingerprints in the database 308 has at least a number K of hash values. It will be understood that the number K will typically be larger than the number N although not essentially so and that the value of K for each stored fingerprint instance in the database 308 may be different between the stored instances as the respective pieces of audio content may have different lengths. Where K>N, the search is typically looking to identify a matched portion rather than the whole of an instance of audio content to replace or augment the audio content of the media content from the first device 302.

One method of reducing N for audio content of the media content from the first device 302 is to reduce a window size while tracking algorithm accuracy and solving for the minimum window size resulting in the maximum accuracy result. However, a preferred way is to pick one or more optimal sections of the database query derived from the audio content of the media content from the first device 302 by attempting to identify what makes such a section likely to contain matching hashes and consequently selecting said one or more such sections for conducting the database search.

One method of achieving this is based on ignoring silent or quiet sections of the piece of audio content and concentrating on noisier sections. Here "noisier" refers to higher signal amplitude sections. From this, it is possible to determine what section constitutes a good database query. Criteria for a good database query may be obtained by taking a noisier section of the piece of audio content having a predetermined length, e.g., 15 seconds and tracking search results for this section to determine if the result provides a correct match. This can be enhanced by splitting the selected noisier section of predetermined length into several smaller individual database queries and tracking their responses. The quality of the responses to the several smaller sections can then be assessed or analyzed to identify what constitutes an effective (good) or ineffective database query. A limitation of a smallest useful size of a query is dictated by the MAX_HASH_TIME_DELTA which is 500 spectrogram ticks or 6.4 seconds. This presently comprises the maximum time distance when forming hashes of the piece of audio content in accordance with the methods of the invention.

Having established what constitutes an effective section of a piece of audio content for forming a database query, the method of reducing the number N of query hashes for searching the database may comprise the steps at the server 310 of: (i) receiving the piece of audio content; (ii) retrieving, extracting or generating fingerprint data for said piece of audio content; (iii) scanning said fingerprint data to identify high-quality and low-quality sections or regions; (iv) discarding from said fingerprint data any low-quality sections or regions; and (v) using the remaining sections of regions of the fingerprint data to establish or derive the database query.

One solution of reducing the database size is to search through the database 308 chronologically or according to location or to use a number of pre-known assumptions to rule out edge cases, but such a method is not optimal.

A preferred method is to use feature vector clustering. This involves extracting one or more feature vectors with preferably a time invariant length from each piece of audio content recorded or provided by any of the one or more second devices 306 to create respective representative characteristics for said pieces of audio content recorded or provided by any of the one or more second devices 306. The same process is applied to the audio content of media content from the first device 302 for which a matched portion of audio content is sought. Feature vectors are derived from audio content features. One type of audio content features that may be used to extract feature vectors are the physical features of the audio content signal such as, for example, beats per minute (bpm), the energy function, the spectrum, the cepstral coefficients, the fundamental frequency of the signal. Another type of audio content feature that may be used to derive feature vectors comprises perceptual features which relate to how a human perceives the audio sound. The perceptual features comprise, for example, loudness, brightness, pitch, timbre, rhythm, etc. It is also possible to use short-term physical features of the audio content signal such as the energy function, the average zero-crossing rate, and the fundamental frequency, as well as the spectral peak tracks of the audio content signal. The feature vectors extracted for any audio content recorded or provided by any of the one or more second devices 306 or for audio content recorded or provided by the one or more second first devices 302 are provided to the database 308 for use in searches of the database 308.

A search operation of the database 308 may be reduced by using Agglomerative Clustering of said extracted feature vectors to reduce the search to 'like' database instances. This can be thought of as getting the beats per minute "bpm" of the piece of audio content from the first device 302 from which the database query is formed and searching through the database 308 only those instances with a similar representative characteristic, e.g., a similar bpm, although, in practice, bpm alone will not scale because of the prevalence of common bpm's such as 80, 120 and 170, but it provides a good starting point. Whilst it is preferred that the length of extracted feature vectors is invariant of time, the method can still be implemented using a predetermined feature vector length that is applied, i.e., made standard, across the whole database.

The method therefore comprises for some embodiments, the step of using said one or more feature vectors to reduce a size of a search of stored instances of audio content recorded or provided by the one or more second devices 306 prior to performing the audio/acoustic tag and/or fingerprint search proper to try and find a matched portion of audio content.

Embodiments of the invention have been described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by the applicable law. Moreover, any combination of the above-described elements in all possible variations thereof is encompassed by the invention unless otherwise indicated herein or otherwise clearly contradicted by context.

The invention claimed is:

1. A method of replacing or augmenting first device recorded audio content by second device recorded audio content in media content recorded by the first device, the media content comprising the audio content recorded by the first device synchronized with video content, the method comprising the steps of:
receiving the first device recorded media content;
based on tag data and/or fingerprint data associated with the audio content of the media content, performing an audio/acoustic tag and/or fingerprint search to match the audio content of said media content with a portion of audio content recorded or provided by the second device; and
replacing or augmenting the audio content of the media content with the matched portion of the audio content recorded or provided by the second device by compiling the matched portion of the audio content with the video content of the media content;
wherein the method includes compensating for an amount of timing misalignment between the audio content of the media content and the matched portion of the audio content recorded or provided by the second when compiling the matched portion of the audio content with the video content of the media content.

2. The method of claim 1, wherein the method includes, prior to compiling the matched portion of the audio content with the video content of the media content, determining an amount of timing misalignment between the audio content of the media content and the matched portion of the audio content.

3. The method of claim 2, wherein the step of determining an amount of timing misalignment comprises comparing one or more segments of the audio content of the media content with one or more segments of the matched portion of the audio content recorded or provided by the second device.

4. The method of claim 3, wherein the one or more segments of the audio content of the media content and the one or more segments of the matched portion of the audio content recorded or provided by the second device are provided by processing each of said audio content of the media content and the matched portion of the audio content using a Hanning window to provide for each one or more window segments of a predetermined, selected, or calculated size.

5. The method of claim 4, wherein the predetermined, selected, or calculated size of the one or more window segments is set at twice a value of an expected or anticipated timing misalignment between the audio content of the media content and the matched portion of the audio content.

6. The method of claim 4, wherein the one or more segments of the audio content of the media content are cross-correlated with the one or more segments of the matched portion of the audio content recorded or provided by the second device to obtain a cross-correlation array from which the amount of the timing misalignment is determined.

7. The method of claim 6, wherein the one or more segments of the audio content of the media content are cross-correlated with the one or more segments of the matched portion of the audio content recorded or provided by the second device using Generalized Cross Correlation with Phase Transform (GCC-PHAT).

8. The method of claim 6, wherein a plurality of the segments of the audio content of the media content are cross-correlated with a plurality of the segments of the matched portion of the audio content recorded or provided by the second device to provide an array of misalignment timings.

9. The method of claim 8, wherein a median value of the array of misalignment timings is taken to be the amount of timing misalignment used to compensate the timing of the matched portion of the audio content recorded or provided by the second device when compiling it with the video content of the media content.

10. The method of claim 8, wherein misalignment timings in the array of timing misalignments which fall outside a predetermined, selected or calculated range of a most common value of the misalignment timings are discounted when determining a median value of the array of misalignment timings to be taken as the amount of timing misalignment used to compensate the timing of the matched portion of the audio content recorded or provided by the second device when compiling it with the video content of the media content.

11. A method of replacing or augmenting first device recorded audio content by second device recorded audio content in media content recorded by the first device, the media content comprising the audio content recorded by the first device synchronized with video content, the method comprising the steps of:
receiving the first device recorded media content;
based on tag data and/or fingerprint data associated with the audio content of the media content, performing an audio/acoustic tag and/or fingerprint search to match the audio content of said media content with a portion of audio content recorded or provided by the second device; and
replacing or augmenting the audio content of the media content with the matched portion of the audio content recorded or provided by the second device by compiling the matched portion of the audio content with the video content of the media content;
wherein the step of obtaining tag data and/or fingerprint data for the audio content of the media content comprises:
determining a plurality of hash values based on frequency peaks of the audio content of the media content.

12. The method of claim 11, wherein it includes determining one or more metrics from said plurality of hash values.

13. The method of claim 11, wherein the step of performing an audio/acoustic tag and/or fingerprint search comprises using one or more of said plurality of hash values or one or more metrics determined from said plurality of hash values to search for one or more matching hash values or one or more matching metrics of said stored instances of second device recorded or provided audio content.

14. The method as claimed in 13, wherein any matching metrics of the stored instances of second device recorded or provided audio content are ranked to determine which stored instance of second device recorded or provided audio content comprises the matched portion of the audio content recorded or provided by the second device or comprises a best matched portion of the audio content recorded or provided by the second device.

15. The method of claim 11, wherein, prior to storing instances of audio content recorded by the one or more second devices, each instance of audio content recorded by the one or more second devices is processed in the same manner as the audio content of the media content by:
   determining a plurality of hash values based on frequency peaks for each instance of audio content recorded by the one or more second devices; and optionally
   determining one or more metrics from said plurality of hash values.

16. The method of claim 11, wherein the audio content of the media content is down-sampled prior to obtaining tag data and/or fingerprint data for said audio content of the media content.

17. The method of claim 11, wherein the plurality of hash values are determined by selecting a frequency peak of said audio content of the media content and determining hash values of other frequency peaks with respect to the selected frequency peak.

18. A method of replacing or augmenting first device recorded audio content by second device recorded audio content in media content recorded by the first device, the media content comprising the audio content recorded by the first device synchronized with video content, the method comprising the steps of:
   receiving the first device recorded media content;
   based on tag data and/or fingerprint data associated with the audio content of the media content, performing an audio/acoustic tag and/or fingerprint search to match the audio content of said media content with a portion of audio content recorded or provided by the second device; and
   replacing or augmenting the audio content of the media content with the matched portion of the audio content recorded or provided by the second device by compiling the matched portion of the audio content with the video content of the media content;
   wherein, prior to performing the audio/acoustic tag and/or fingerprint search, obtaining one or more feature vectors from the audio content of the media content, and using said one or more feature vectors to reduce a size of a search of stored instances of audio content recorded or provided by the one or more second devices.

19. The method of claim 18, wherein the step of obtaining one or more feature vectors from the audio content of the media content comprises obtaining one or more feature vectors from one or more selected portions of the audio content of the media content.

20. The method of claim 18, wherein one or more feature vectors are invariant in time and/or have a predetermined length.

* * * * *